US009131284B2

(12) United States Patent
Tsau et al.

(10) Patent No.: US 9,131,284 B2
(45) Date of Patent: Sep. 8, 2015

(54) VIDEO-IN-VIDEO VIDEO STREAM HAVING A THREE LAYER VIDEO SCENE

(71) Applicant: OMNIVISION TECHNOLOGIES, INC., Santa Clara, CA (US)

(72) Inventors: Guannho George Tsau, San Jose, CA (US); Jizhang Shan, Cupertino, CA (US); Hui Pan, San Jose, CA (US); Kah-Ong Tan, Shanghai (CN)

(73) Assignee: OmniVision Technologies, Inc., Santa Clara, CA (US)

( * ) Notice: Subject to any disclaimer, the term of this patent is extended or adjusted under 35 U.S.C. 154(b) by 348 days.

(21) Appl. No.: 13/734,514

(22) Filed: Jan. 4, 2013

(65) Prior Publication Data

US 2014/0192198 A1    Jul. 10, 2014

(51) Int. Cl.
*H04N 7/18* (2006.01)
*H04N 7/14* (2006.01)
*G06K 9/36* (2006.01)
*H04N 21/81* (2011.01)
*H04N 21/414* (2011.01)
*H04N 21/4223* (2011.01)
*H04N 21/44* (2011.01)
*H04N 19/29* (2014.01)
*H04N 21/4402* (2011.01)
*H04N 19/597* (2014.01)
(Continued)

(52) U.S. Cl.
CPC .............. *H04N 21/816* (2013.01); *H04N 19/23* (2013.01); *H04N 19/29* (2013.01); *H04N 19/597* (2013.01); *H04N 21/41407* (2013.01); *H04N 21/4223* (2013.01); *H04N 21/44008* (2013.01); *H04N 21/440227* (2013.01); *H04M 1/0264* (2013.01)

(58) Field of Classification Search
CPC .................. H04N 21/41407; H04N 21/44008; H04N 19/29; H04N 19/597
See application file for complete search history.

(56) References Cited

U.S. PATENT DOCUMENTS

2006/0114987 A1    6/2006    Roman
2010/0053436 A1    3/2010    Arisaka
(Continued)

FOREIGN PATENT DOCUMENTS

CN          202143152 U     2/2012

OTHER PUBLICATIONS

"htc EVO 3D" user Guide, May 2011, Sprint.*
(Continued)

*Primary Examiner* — Dave Czekaj
*Assistant Examiner* — Tsion B Owens
(74) *Attorney, Agent, or Firm* — Blakely Sokoloff Taylor & Zafman LLP (57) ABSTRACT

A mobile computing device includes first, second and third cameras coupled to produce first, second and third camera video streams, respectively. The first camera is on a first side of the mobile computing device, and the second and third cameras are included in a stereo camera on a second side of the mobile computing device. A video processor is coupled to generate an output video stream including a first video layer generated from the first camera video stream. The video processor is further coupled to generate the output video stream to include second and third video layers from the second camera video stream in response to the second and the third camera video streams. The video processor is further coupled to overlay the first video layer between the second video layer and the third video layer in the output video stream.

37 Claims, 9 Drawing Sheets

(51) Int. Cl.
  *H04N 19/23* (2014.01)
  *H04M 1/02* (2006.01)

(56) References Cited

U.S. PATENT DOCUMENTS

2012/0154526 A1 6/2012 Ji et al.
2012/0254301 A1 10/2012 Fiero
2012/0324404 A1 12/2012 Pahlavan et al.
2014/0192199 A1 7/2014 Tan et al.

OTHER PUBLICATIONS

U.S. Appl. No. 13/718,988, filed Dec. 18, 2012.

\* cited by examiner

VIDEO-IN-VIDEO VIDEO STREAM HAVING A THREE LAYER VIDEO SCENE

BACKGROUND INFORMATION

1. Field of the Disclosure

The present invention relates generally to a mobile computing device, and more specifically to a mobile phone or smartphone that can produce a video-in-video (ViV) video stream having a three layer video scene.

2. Background

It becomes common practice to share videos on line. Usually, a video stream is uploaded from a stored video file to a server. A plurality of receivers may download the uploaded video from the server at different time. The stored video file may be produced by a single video camera. The uploading and downloading are not in real-time.

Mobile computing devices such as mobile phones, smartphones, tablet computers or the like have become ubiquitous. Indeed, it is believed that the number of mobile phones in the world today is approaching, if not surpassing, the population of the entire world. There is now a growing demand for the ability to broadcast a real-time video stream from a mobile phone.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As an increasing number of mobile phones include multiple video cameras, the merging of multiple video streams from multiple video cameras of the same mobile phone forming a single video-in-video (ViV) video stream may be useful. As will be discussed, examples in accordance with the teachings of the present invention are directed to a mobile computing device, such as for example a mobile phone, smartphone, tablet computer, or the like, having a single front camera and a pair of back cameras, which form a stereo camera. Examples in accordance with the teachings of the present invention combine the video stream produced by the single front camera of the mobile computing device with a video stream produced by one of the back cameras of the mobile computing device. Since the front camera faces the user of the mobile computing device, the front camera video stream includes a subject, which is the user of the mobile computing device. In one example, the subject can be extracted by trimming the background such that the front camera video stream include the face and body of the subject alone with the background removed from the scene. In one example, the front camera video stream including the subject alone is properly scaled to form a mid video layer scene.

In one example, the back cameras of the mobile computing device face the view that the user of the mobile computing device also faces. Based on triangulation, objects in a scene of the back camera video stream produced by a back camera can be divided into a far zone and a near zone. Objects in the far zone are included in a back video layer scene, and objects in the near zone are included in a front video layer scene.

In the example, the mid video layer scene from the front camera is overlaid on the top of the back video layer scene, and the front video layer scene is overlaid on the top of the mid video layer scene, forming a ViV video stream having three video layers. The resulting ViV video stream shows the subject integrated into the background scene that is actually viewed by the subject, with proper occlusion. In reality, the subject is not in the background. In one example, the formed ViV video stream can be uploaded to a server and then broadcast by the server in real-time through the Internet. Thus, in one example, a live view of an ongoing event can be broadcasted in real-time from a mobile computing device with the user of the mobile computing device incorporated into the live view. In reality, the presenter is not in the live view. Since the presenter actually views the live view, the presenter can comment precisely on the live view.

Figure 1:
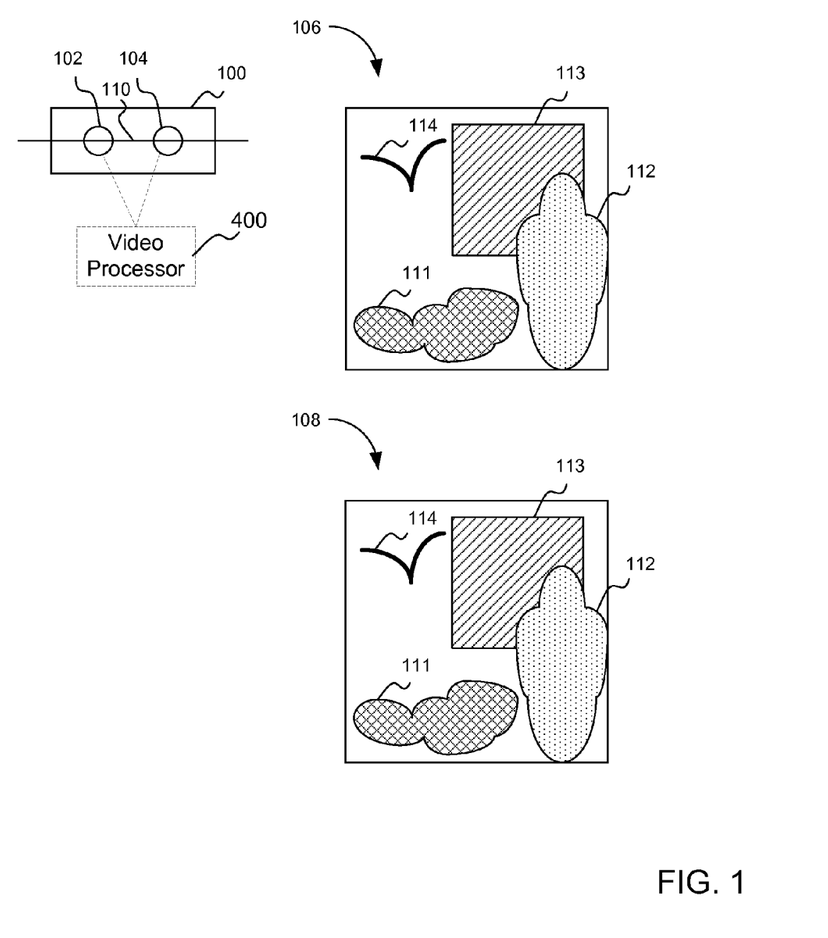
FIG. 1 shows an example stereo camera having a left camera producing a left scene and a right camera producing a right scene in accordance with the teachings of the present invention.

To illustrate, FIG. 1 shows an example stereo camera 100 of a mobile computing device having a left camera 102 and a right camera 104 in accordance with the teachings of the present invention. For explanation purposes and as illustrated in the example depicted in FIG. 1, it is assumed in this disclosure that the lens of left camera 102 and the lens of right camera 104 are located at substantially the same locations as left camera 102 and right camera 104, respectively. Therefore, as shown in the example depicted in FIG. 1, there is a baseline 110 distance between left camera 102 and right camera 104. In one example, a video processor 400 is included in the mobile computing device and is coupled to left camera 102 and right camera 104. Left camera 102 produces a left camera video stream 106, which in one example is coupled to be received and processed by video processor 400. Right camera 104 produces a right camera video stream 108, which in one example is coupled to be received and processed by video processor 400. As left camera 102 and right camera 104 are both included in stereo camera 100, the scene in left camera video stream 106 and the scene in right camera video stream 108 both include same objects 111, 112, 113, and 114 having a parallax. Standard methods well known in the art, such as triangulation, can be used to measure the parallax and determine the distances of objects 111-114 to baseline 110 of stereo camera 100.

Figure 2:
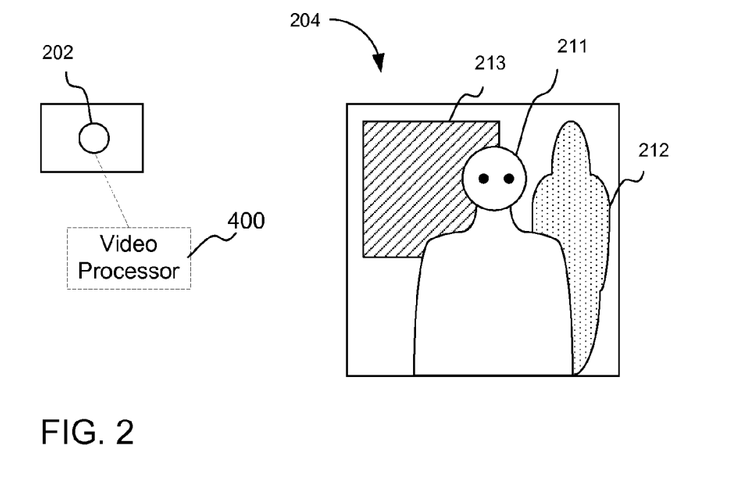
FIG. 2 shows an example single camera producing a scene in accordance with the teachings of the present invention.
Figure 3:
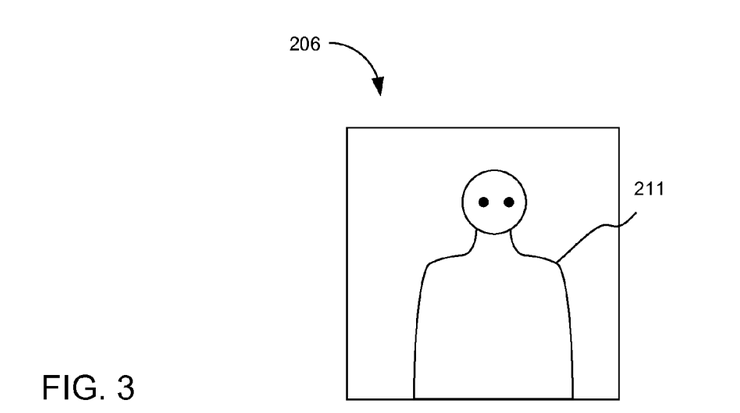
FIG. 3 shows an example scene of FIG. 2 that the background is trimmed and a subject is left alone in accordance with the teachings of the present invention.

FIG. 2 shows an example single camera 202 of a mobile computing device coupled to a video processor 400 in accordance with the teachings of the present invention. In one example, the mobile computing device and video processor 400 depicted in FIG. 2 are the same mobile computing device and video processor 400 depicted in FIG. 1 illustrating stereo camera 100. In another example, the mobile computing device and video processor 400 depicted in FIG. 2 are in a different mobile computing device than the example depicted in FIG. 1. Referring back to the example depicted in FIG. 2, camera 202 is a front camera of the mobile computing device and produces a front camera video stream 204 including a subject 211 and background objects 212 and 213. Background objects 212 and 213 can be trimmed from the scene of front camera video stream 204, so that only subject 211 alone is left in a front camera video stream 206 as shown in FIG. 3 in accordance with the teachings of the present invention.

In one example, methods well known in the art may be used for trimming background objects 212 and 213 from front camera video stream 204. For instance, in one example, a green screen or a blue screen technique may be utilized. The green screen or blue screen techniques, which are also known as chroma key compositing or chroma keying, are a special technique for composing or layering two images together based on color hues or chroma range. The technique has been used heavily in many fields to remove a background from the subject of a photo or video, such as for example newscasting. A color range in the top layer is made transparent, revealing another scene behind. This can be done with backgrounds of any color that are uniform and distinct, but green and blue backgrounds are more commonly used because they differ most distinctly in hue from most human skin colors. No part of the subject in the video may duplicate a color used in the background. In this manner, the subject stands in front of a green or blue screen. The background of green or blue screen is trimmed in a background trimming process.

To illustrate, green screen or blue screen chroma key compositing techniques are often used in weather forecast news broadcasts on television, in situations where the subject (e.g., meteorologist) appears to be standing in front of a large weather map during a live television newscasts. However, in reality, the subject is actually standing in front of a large blue green background screen. When using a blue screen, different backgrounds (e.g., weather maps) are added on the parts of the image in the background behind the subject where the color is blue. If the subject wears blue clothes, his or her clothes will also be replaced with the background scene. A similar system is used for green screens. Various computer programs are available to create videos using the green screen or blue screen chroma key compositing techniques.

Figure 4:
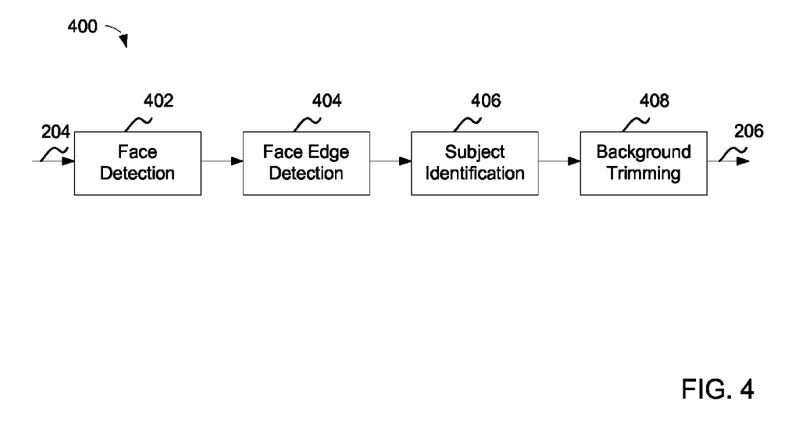
FIG. 4 shows an example functional block diagram of a video processor coupled to identify a subject in a video scene in accordance with the teachings of the present invention.

In one example, the subject using the mobile computing device is not required to stand in front of a green or blue screen. In one example, video processor 400 of a mobile computing device utilizes advanced processing to trim the background scene from a front camera video stream 204 to form front camera video stream 206 including a subject 211 alone. For example, FIG. 4 depicts a functional block diagram illustrating processing blocks included in one example of a video processor 400 of a mobile computing device in accordance with the teachings of the present invention. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

As shown in the depicted example, the video processor 400 is coupled to identify a subject in a video scene in accordance with the teachings of the present invention. In the example, a front camera video stream 204 is coupled to be received from the front camera of a mobile computing device by a face detection unit 402 of video processor 400. Face detection unit 402 includes processing technology that determines the locations and sizes of human faces in arbitrary digital images. In one example, face detection unit 402 detects facial features and ignores anything else, such as buildings (e.g., 213 of FIG. 2), trees (e.g., 212 of FIG. 2), and bodies. Face detection is commonly used in autofocus of a digital camera. After the face of the subject is detected, the edge of the face is determined in a face edge detection unit 404. The location and edge of the face are thus identified. Following the face edge detection by face edge detection unit 404, the body of the subject can also be identified and located as the extension from the face. The subject, which includes the face and the body, is identified in a subject identification unit 406. Following the subject identification by subject identification unit 406, background objects, including objects 212 and 213, excluding the face and body of the subject can be trimmed from scene 204 in a background trimming unit 408 to produce scene 206 including the face and body of subject 211 alone without the background. In one example, scene 206 will be a mid layer in accordance with the teachings of the present invention. In various examples, it is appreciated that the processing blocks included in video processor 400 can be implemented in hardware, computer software, firmware, and/or combinations thereof, included in a mobile computing device in accordance with the teachings of the preset invention.

In one example, only one scene from scenes 106 and 108 is used for forming two other video layers, which are back and front video layers. The back video layer, the mid video layer and front video layer together form a three layer video-in-video (ViV) video stream in accordance with the teachings of the present invention. In one example, scene 106 is used to form the back and front video layers of the three layer ViV video stream. Objects 111-114 in scene 106 are first identified. In another example, it is appreciated that scene 108 can be used as well. Standard methods in the art can be used for object identification. For example, the boundary or edge of an object can be recognized and thus it can be identified using its texture and/or color. Additionally, the parts of the same object are assumed to have substantially the same distance to baseline 110 of stereo camera 100.

Continuing with the example, after objects 111-114 in scene 106 are identified, or in other words, after the all of the boundaries or edges of objects 111-114 are recognized, the distance of each of the objects 111-114 to baseline 110 of stereo camera 100 can be determined based on, for example, triangulation using the parallax of left scene 106 and right scene 108. For explanation purposes, it is assumed in the depicted example that the determined distances of objects 111, 112, 113, and 114 to baseline 110 of stereo camera 100 are D1, D2, D3, and D4, respectively. In addition, in the depicted example, it is assumed that D1<D2<D3<D4.

Based on their distances D1, D2, D3, and D4, objects 111-114 in scene 106 can be divided into far and near zones. Furthermore, objects in far zone are included in a back video layer, and objects in near zone are included in a front video layer. Scene 206 of FIG. 3 is used as a mid video layer. The distance of mid video layer to baseline 110 of stereo camera 100 can be selected, and it is used to divide the far and near zones. Objects farther than the distance of mid video layer to baseline 110 of stereo camera 100 are included in the far zone, and objects nearer than the distance of mid video layer to baseline 110 of stereo camera 100 are included in the near zone.

Figure 5:
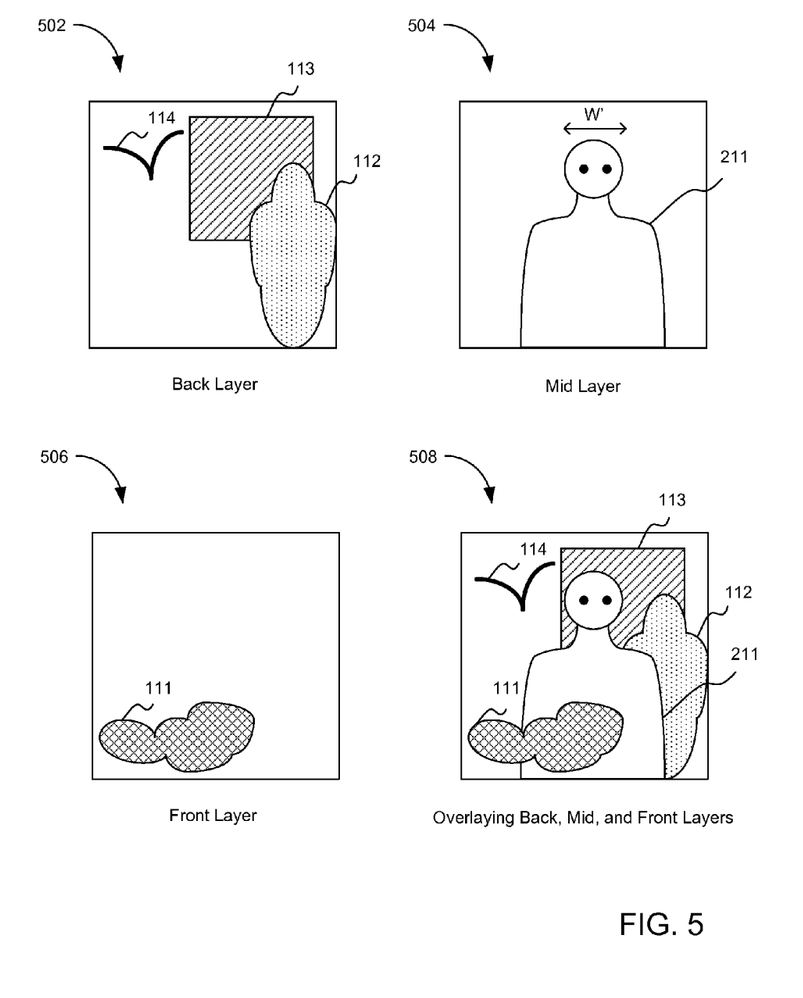
FIG. 5 shows an example of an overlaying mid video layer between a back video layer and a front video layer resulting in a ViV video stream having three layers of video scene in accordance with the teachings of the present invention.

For example, a distance of mid video layer, DS (S stands for subject) is selected as D1<DS<D2, as shown in FIG. 5 in accordance with the teachings of the present invention. A back video layer 502 includes objects 112, 113, and 114. A mid video layer 504 is a properly scaled scene 206 of FIG. 3 including subject 211. A front video layer 506 includes object 111. Overlaying mid video layer 504 on back video layer 502, and further overlaying front video layer 506 on mid video layer 504 result in a ViV video scene 508 having three video layers. In other words, mid video layer 504 is overlaid between front video layer 506 and back video layer 502 in accordance with the teachings of the present invention. In the resulting ViV video scene 508, subject 211 occludes objects 112 and 113 in back video layer 502, and object 111 in front video layer 506 occludes subject 211. Note that objects in front video layer 508 already appropriately occlude objects in back video layer 502 since the objects in front video layer 508 and back video layer 502 are originally cut from scene 106.

As illustrated in the depicted example, the size of subject 211 in mid video layer 504 is properly scaled. For instance, it is assumed the width W of a human face is approximately 18 cm. It is appreciated that W can be assumed other values. Referring to the magnification of camera 102 and the distance DS, scene 206 can be scaled such that the width of face of subject 211 W' in mid video layer 504 will be equivalent to W or about 18 cm if subject 211 stands at a distance DS from baseline 110 of stereo camera 100. Thus, the subject is appropriately in the mid video layer 504 in the ViV video scene 508 such that the width W of the face of the subject is scaled to be equivalent to a predetermined value, such as for example 18 cm, in the ViV video scene 508 in accordance with the teachings of the present invention. It is appreciated that a predetermined value of 18 cm is provided for explanation purposes herewith and that other predetermined values could also be utilized in accordance with the teachings of the present invention.

Figure 6:
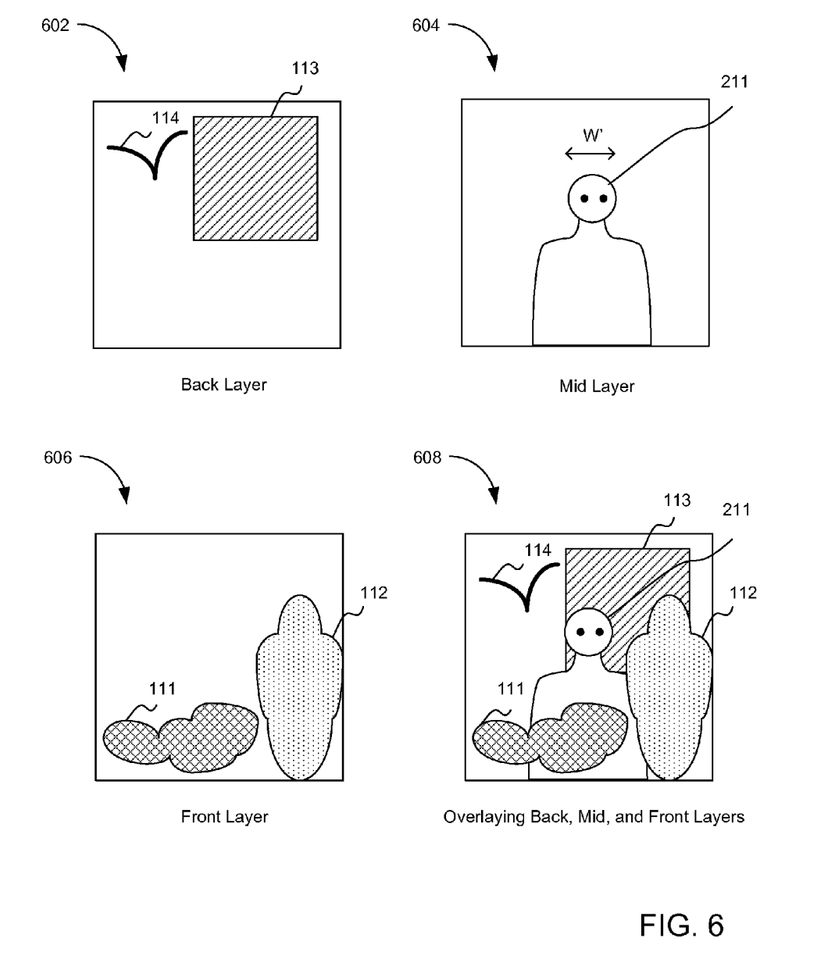
FIG. 6 shows another example of an overlaying mid video layer between a back video layer and a front video layer resulting in a ViV video stream having three layers of video scene in accordance with the teachings of the present invention.

FIG. 6 illustrates another example in which the distance of mid video layer DS is selected as D2<DS<D3 in accordance with the teachings of the present invention. As illustrated, back video layer 602 includes objects 113 and 114. A mid video layer 604 is scene 206 of FIG. 3 including subject 211 properly scaled as described previously. A front video layer 606 includes objects 111 and 112. Overlaying mid video layer 604 on back video layer 602, and further overlaying front video layer 606 on mid video layer 604 result in a ViV video scene 608 having three video layers. In the resulting ViV video scene 608, subject 211 occludes object 113 in back video layer 602, and objects 111 and 112 in front video layer 606 occlude subject 211.

In this manner, a ViV video stream having three video layers can be produced in accordance with the teachings of the present invention. The subject appears standing as part of the background with proper occlusion, although in reality, the subject is not standing in the background. In the ViV video stream, the subject is also properly scaled according to the selected distance where the subject virtually stands. Although a stereo camera 100 is utilized for determining the distances of the various objects in the scene, the produced ViV video stream is not a stereo display. Instead, the resulting three video layer ViV video stream is a single video stream in accordance with the teachings of the present invention.

Figure 7:
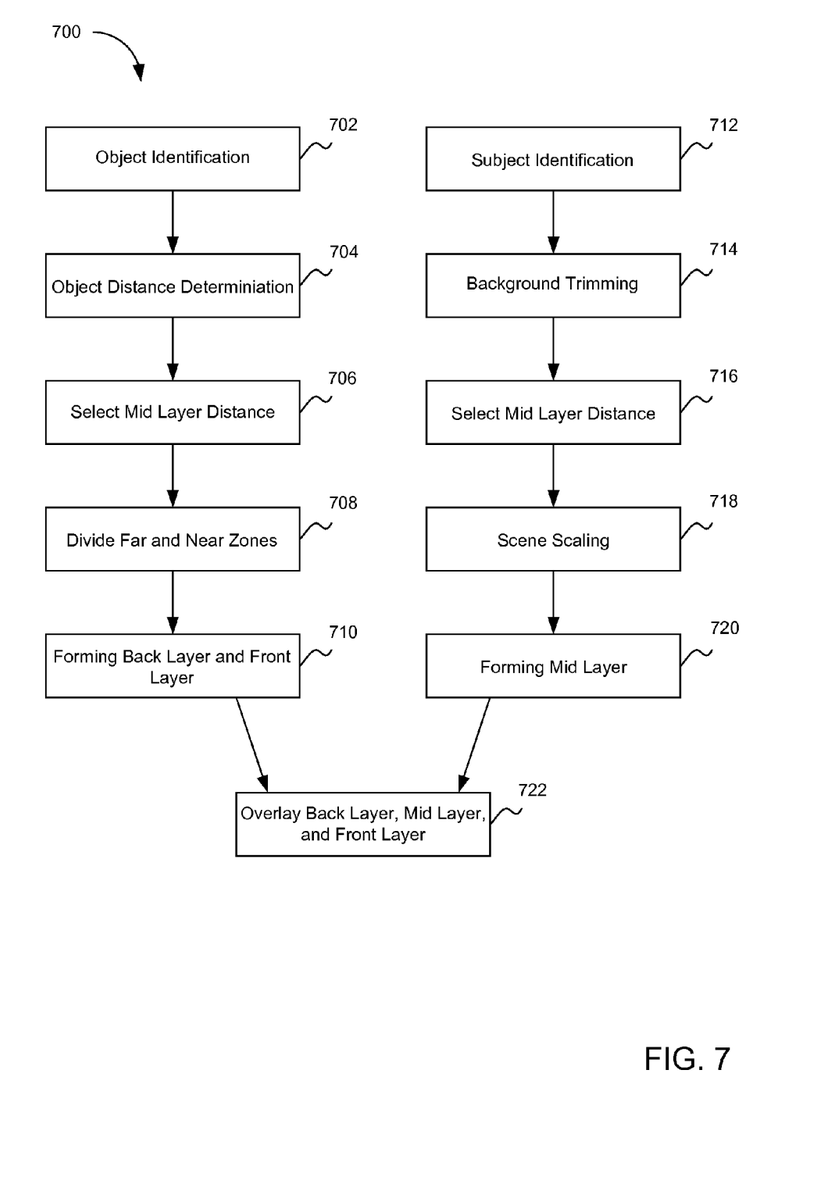
FIG. 7 shows an example block diagram summarizing the process to produce a ViV video stream having three layers of video scene in accordance with the teachings of the present invention.

FIG. 7 shows a block diagram 700 of an example process performed by a video processor, such as for example with advanced processing included in video processor 400 discussed above, coupled to receive the video streams from the front camera and stereo camera to produce a ViV video stream having three video layers of video scene in accordance with the teachings of the present invention. The order in which some or all of the process blocks appear in block diagram 700 should not be deemed limiting. Rather, one of ordinary skill in the art having the benefit of the present disclosure will understand that some of the process blocks may be executed in a variety of orders not illustrated, or even in parallel.

As shown in process block 702, objects in a left or right scene of a stereo camera are identified based on their boundaries or edges, which can be determined using a variety of factors including texture and/or color, among others. In process block 704, the distance of each object is determined based on triangulation using the parallax of left and right scenes. In process block 706, the distance of a mid video layer is selected. In process block 708, objects in a scene are divided into far and near zones. Objects farther than the distance of the mid video layer are included in the far zone, and objects nearer than the distance of the mid video layer are included in the near zone. In process block 710, a back video layer is formed including objects in the far zone, and a front video layer is formed including objects in the near zone.

In process block 712, a subject in a single camera scene, such as for example the front camera, is identified using chroma key compositing methods and/or a video processor to detect the face and body of the subject. In process block 714, the background in the single camera scene is trimmed leaving the face and body of the identified subject alone. In process block 716, the distance of the mid video layer is selected according to process 706. In process block 718, the subject is scaled. For explanation purposes, in one example, the subject is scaled such that the width of face of the subject would be approximately 18 cm in the scene at the mid video layer distance selected according to process block 706. It is appreciated of course that any predetermined values for the width of the face of the subject could be utilized to appropriately scale the subject into the background scene. In process block 720, a mid video layer is formed including the properly scaled subject. In process block 722, the back video layer, mid video layer, and front video layer are overlaid forming a ViV video stream having three video layers in accordance with the teachings of the present invention. Overlaying the mid video layer on the top of the back video layer, and the front video layer on the top of the mid video layer results in the appearance of a subject standing in a background with proper occlusion in accordance with the teachings of the present invention. In various examples, it is appreciated that the processing blocks described in block diagram 700 can be implemented in hardware, computer software, firmware, and/or combinations thereof, included in mobile computing device in accordance with the teachings of the preset invention.

Figure 8:
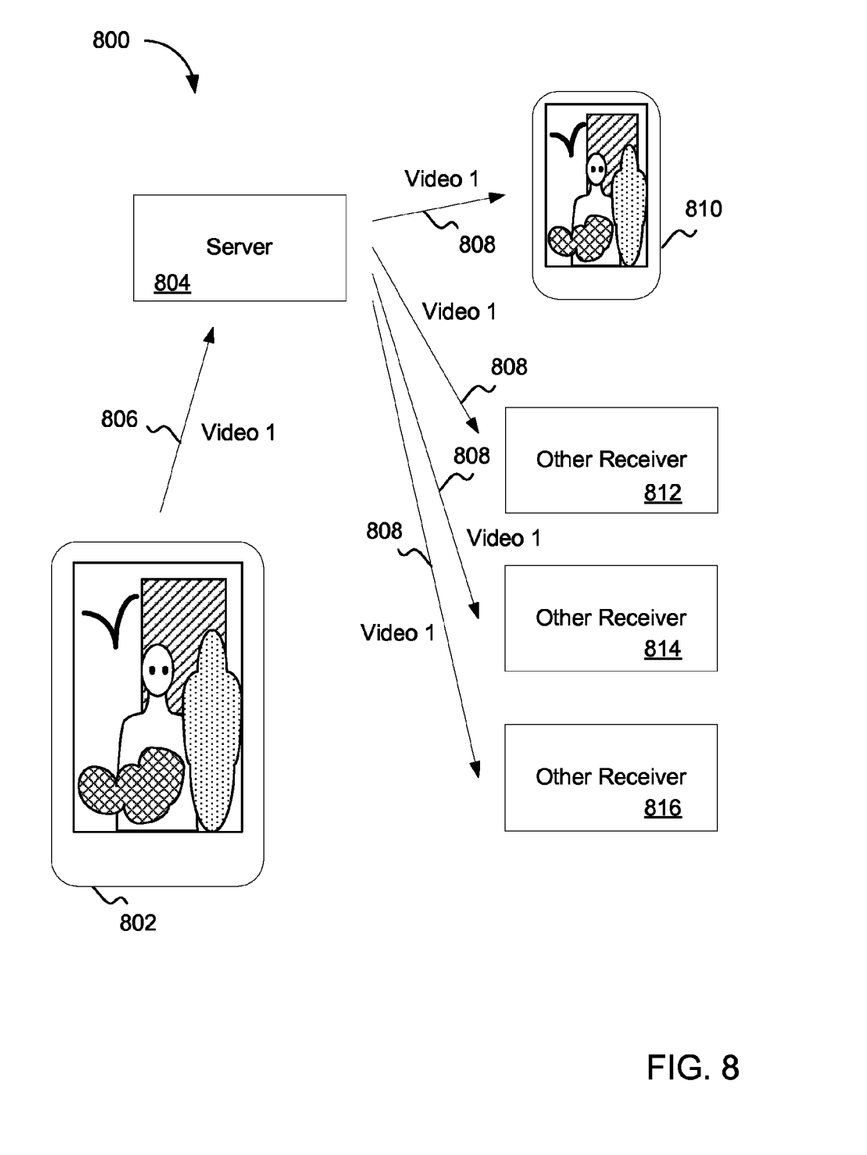
FIG. 8 shows an example mobile computing device connected to a server through the Internet in accordance with the teachings of the present invention.

FIG. 8 shows an example of a mobile computing device 802 connected to a server 804 in a network 800 through the Internet in accordance with the teachings of the present invention. In one example, mobile computing device 802 may be for example a mobile phone, a smartphone, a tablet computer, or the like. As shown in the depicted example, network 800 includes mobile computing device 802, server 804, and a plurality of receivers 810, 812, 814, and 816. The Internet includes a combination of wired and wireless networks. In one example, mobile computing device 802 uses a wireless network to connect with server 804. The wireless network may include a Wi-Fi network, a mobile broadband network, a telephone network, or any appropriate networks. The video processor included in mobile computing device 802 uploads 806 a video stream Video 1 to server 804. In one example, video stream Video 1 is a real-time video stream captured by mobile computing device 802. In one example, video stream Video 1 may be a recorded video stream, which is previously stored in mobile computing device 802.

As mentioned previously, in one example, mobile computing device 802 may be a smartphone. For purposes of this disclosure, a smartphone may be considered as a mobile phone built on a mobile operating system (OS), with more advanced computing capability and connectivity than a feature phone. A smartphone may include the function of a personal digital assistant (PDA), portable media players, and global positioning system (GPS) navigation unit, in addition to video cameras, touch screens, and web browsers. Examples of mobile operating systems (OS) used by modern smart phones include, but are not limited to, Android, iOS, Symbian, BlackBerry OS, Bada, Windows Phone, webOS, and embedded Linux, among others.

After server 804 secures the connection with mobile computing device 802, mobile computing device 802 uploads 806 video stream Video 1 to server 804. The received video stream Video 1 is, in turn, broadcasted 808 by server 804 through the Internet, which includes a combination of wired and wireless networks. In the illustrated example, server 804 broadcasts video stream Video 1 to individual receivers, such as for example receivers 810, 812, 814, and 816. The receivers of the broadcasted video stream Video 1 may include another mobile computing device 810, such as for example a mobile phone, a smartphone, a tablet computer, or the like. In this manner, the user of mobile computing device 810 may watch video stream Video 1. Similarly, other receivers 812, 814, and 816 may watch broadcasted video stream Video 1. In one example, the uploading and broadcasting may be real-time. In another example, the uploading and broadcasting may not be real-time.

Standard methods well known in the art may be used for securing the connection between mobile computing device 802 and server 804, and for broadcasting video stream by server 804 to receivers 810-816. In the depicted example, video stream Video 1 includes both video and audio signals. Video stream Video 1 may also include text, graphics, and other data embedded in the video stream.

Figure 9:
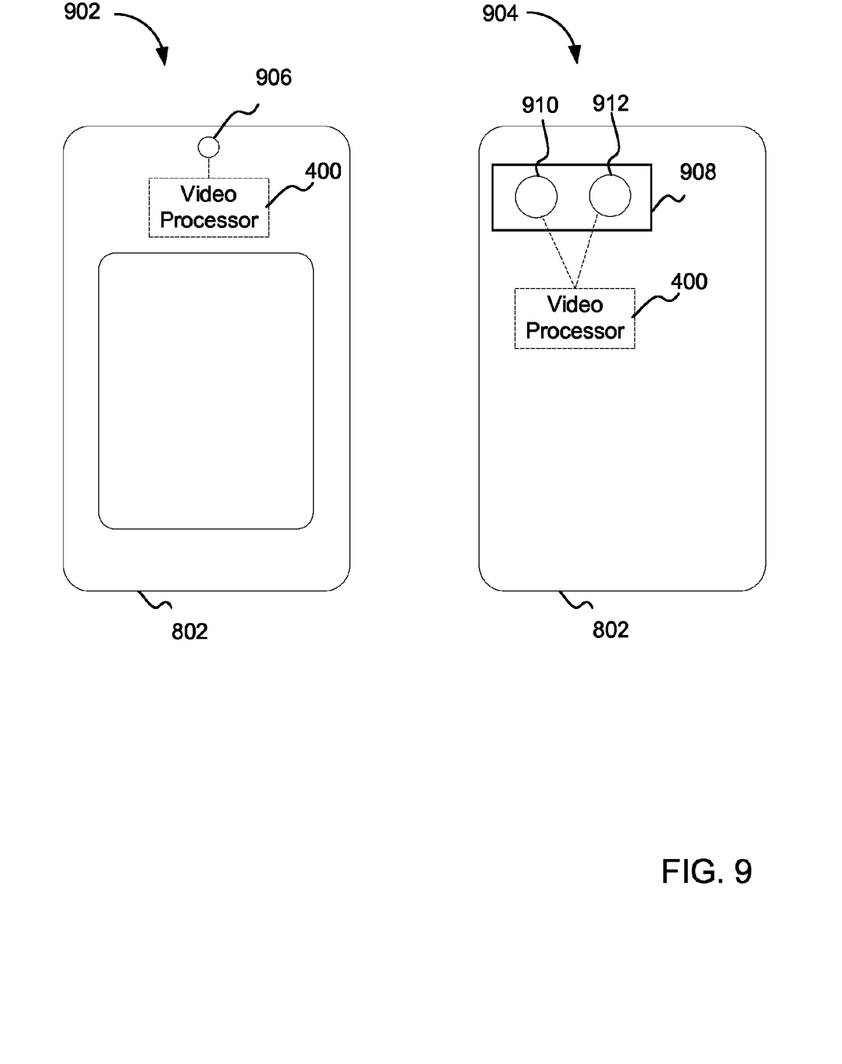
FIG. 9 shows an example of a front side of mobile computing device having a single front camera facing the user of mobile computing device and a back side of mobile computing device having a stereo back camera facing the view that is faced by the user of mobile computing device in accordance with the teachings of the present invention.

FIG. 9 shows a front side 902 of an example mobile computing device 802 having a single front camera 906, which faces the user of mobile computing device 802 in accordance with the teachings of the present invention. In one example, front camera 906 is coupled to provide a front camera video stream to video processor 400. FIG. 9 also shows a back side 904 of mobile computing device 802 having a stereo back camera 908, which faces the view that is faced by the user of mobile computing device 802 in accordance with the teachings of the present invention. Stereo back camera 908 further includes a left back camera 910 and a right back camera 912. In one example, stereo back camera 906 is coupled to provide a left back camera video stream and a right back camera video stream to video processor 400. Front camera 906 produces a front camera video stream including video scene 204 referring to FIG. 2, which may be the view showing the user of mobile computing device 802. Left back camera 910 produces a left back video stream including video scene 106 referring to FIG. 1. Right back camera 912 produces a right back video stream including video scene 108 referring to FIG. 1. Scenes 106 and 108 may be the left and right views that the user of mobile computing device 802 faces.

Referring briefly back to FIG. 7, FIG. 4, FIG. 2 and FIG. 1, video processor 400 is coupled to generate an output ViV video stream having three video layers including objects and a subject from video scene 204 and video scene 106 or video scene 108. In one example, video processor 400 of a mobile computing device performs the process described in FIG. 7 to generate the output ViV video stream having three video layers. In the example depicted in FIG. 8, the generated output ViV video stream is shown as Video 1, which is uploaded 806 to server 804.

In this manner, a user of mobile computing device 802 can generate a ViV video stream including the view that he or she faces with his or her image in the middle video layer scaled at a mid video layer distance from the mobile computing device 802 and having proper occlusion (i.e., his or her image appropriately occludes the back objects). Thus, relatively close objects that are overlaid in the front video layer, which are determined to be a distance less than the mid video layer distance from the mobile computing device 802 appropriately occlude his or her image in the formed ViV video stream Video 1. In addition, relatively far objects that are overlaid in the rear video layer, which are determined to be a distance greater than the mid video layer distance from the mobile computing device 802 are appropriately occluded by his or her image in the formed ViV video stream Video 1. Furthermore, the generated ViV video stream Video 1 is uploaded 806 to a server, and the server broadcasts the video stream Video 1 to receivers 810-816. In one example, the uploading and broadcasting of Video 1 may be real-time. In another example, the uploading and broadcasting of Video 1 may not be real-time.

Figure 10:
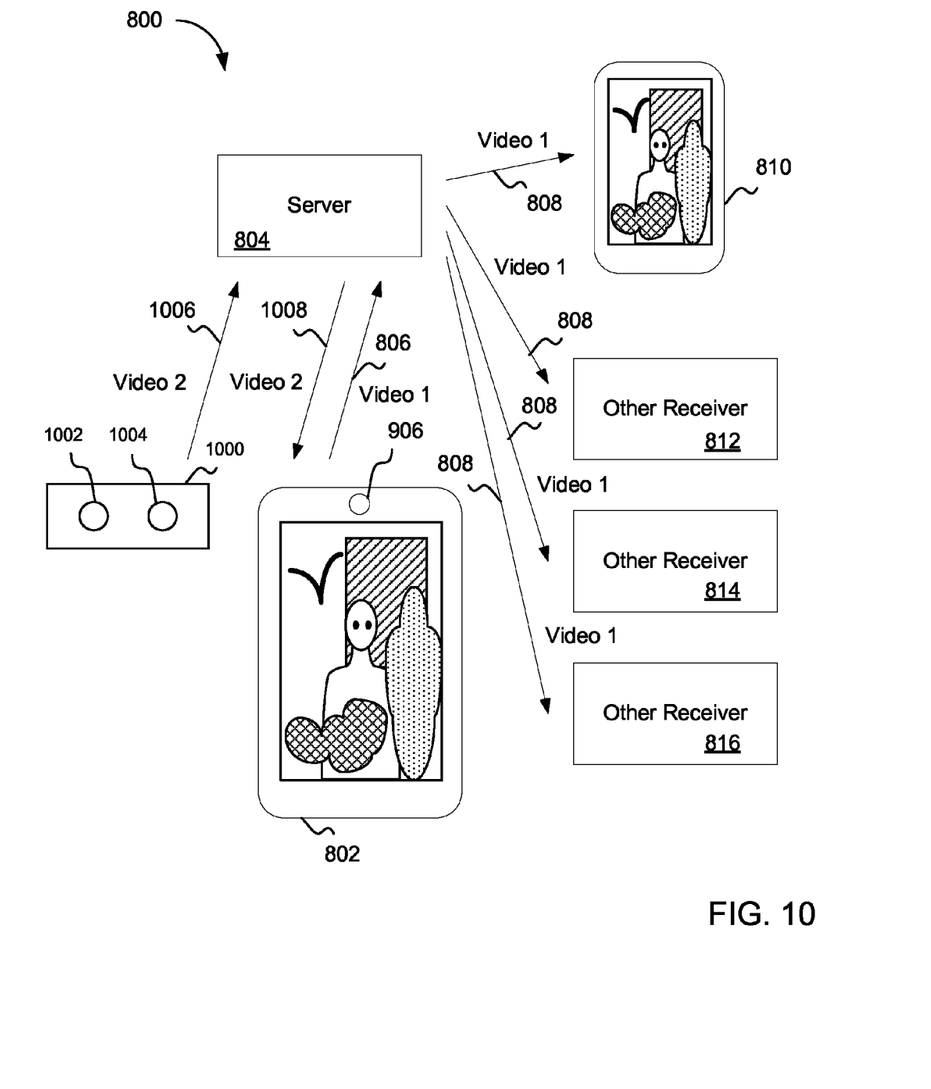
FIG. 10 shows an example device uploading a stereo video stream produced by a stereo camera replacing the left and right camera video streams produced by the stereo back camera of a mobile computing device in accordance with the teachings of the present invention.

FIG. 10 shows an example in which the background stereo scenes 106 and 108 are not from mobile computing device 802 in accordance with the teachings of the present invention. To illustrate, a mobile computing device 1000, or another device having a stereo camera, including a left camera 1002 producing a left video stream including a left video scene 106 of FIG. 1, and a right camera 1004 producing a right video stream including a right video scene 108 of FIG. 1, uploads 1006 a stereo video stream Video 2 including the left and right video streams to server 804 in a network 800. Network 800 includes mobile computing device 802, device 1000, server 804, and a plurality of receivers 810, 812, 814, and 816 as shown. It is noted that a stereo video stream may need a doubled bandwidth for uploading. Mobile computing device 802 receives 1008 stereo video stream Video 2 from server 804. A video stream including video stream 204 of FIG. 2 produced by front camera 906 of mobile computing device 802 is processed together with video stream Video 2 forming a ViV video stream Video 1 having three video layers as described previously in accordance with the teachings of the present invention. The formed ViV video stream Video 1 is uploaded 806 to server 804. Server 804, in turn, broadcasts Video 1 to receivers 810-816. In one example, the uploading and broadcasting may be real-time. In another example, the uploading and broadcasting may not be real-time.

It is also appreciated that the real-time uploading and real-time broadcasting may include delays caused by the Internet traffic. In one example, a delay of up to several seconds may be considered real-time for purposes of this disclosure in accordance with the teachings of the present invention. In another example, it is appreciated that a longer delay may still also be considered real-time for purposes of this disclosure in accordance with the teachings of the present invention.

As mentioned previously, the processes explained above may be implemented with the utilization of computer software and hardware. The techniques described may constitute machine-executable instructions embodied within a tangible or non-transitory machine (e.g., computer) readable storage medium, that when executed by a machine, such as for example video processor 400, will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, mobile computing device, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A mobile computing device, comprising:
a first camera on a first side of the mobile computing device, wherein the first camera is coupled to produce a first camera video stream;
a second camera on a second side of the mobile computing device, wherein the second camera is coupled to produce a second camera video stream;
a third camera on the second side of the mobile computing device, wherein the third camera is coupled to produce a third camera video stream, wherein the second camera and the third camera are included in a stereo camera of the mobile computing device; and
a video processor coupled to generate an output video stream including a first video layer generated from the first camera video stream, wherein the video processor is further coupled to generate the output video stream having a second video layer and a third video layer generated from the second camera video stream in response to the second camera video stream and the third camera video stream, wherein the video processor is coupled to overlay the first video layer between the second video layer and the third video layer in the output video stream.

2. The mobile computing device of claim 1 wherein the video processor is coupled to the stereo camera to generate the second video layer and the third video layer of the output video stream from the second camera video stream in response to the second camera video stream and the third camera video stream such that a third object in the third video layer of the output video stream is farther away from the stereo camera than a second object in the second video layer of the output video stream.

3. The mobile computing device of claim 2 wherein a first object in the first video layer of the output video stream that is overlaid between the second video layer and third video layer of the output video stream is coupled to be scaled by the video processor to be farther from the stereo camera than the second object in the second video layer, and wherein the first object in the first video layer is coupled to be scaled by the video processor to be closer to the stereo camera than the third object in the third video layer of the output video stream.

4. The mobile computing device of claim 3 wherein the second object in the second video layer of the output video stream occludes the first object in the first video layer of the output video stream, and wherein the first object in the first video layer of the output video stream occludes the third object in the third video layer of the output video stream.

5. The mobile computing device of claim 2 wherein the video processor is further coupled to identify the second object in the second and third camera video streams and determine a distance of the second object from the stereo camera based on a parallax of the second object between the second and third camera video streams, wherein the video processor is further coupled to identify the third object in the second and third camera video streams and determine a distance of the third object from the stereo camera based on a parallax of the third object between the second and third camera video streams, wherein the distance of the second object from the stereo camera is less than the distance of the third object from the stereo camera.

6. The mobile computing device of claim 1 wherein the video processor is further coupled to place any objects identified in the second and third camera video stream that are closer to the stereo camera than a mid video layer distance in the second video layer, wherein the video processor is further coupled to place any objects identified in the second and third camera video stream that are farther from the stereo camera than the mid video layer distance in the third video layer, and wherein the video processor is further coupled to place a first object in the first camera video stream at the mid video layer distance in the first video layer.

7. The mobile computing device of claim 1 wherein the video processor is further coupled to trim a background from the first camera video stream to overlay a subject alone in the first video layer between the second video layer and the third video layer in the output video stream, wherein the subject is a user of the mobile computing device.

8. The mobile computing device of claim 7 wherein the video processor is further coupled to scale the subject in the first video layer of the output video stream such that a width of a face of the subject is scaled to be equivalent to a predetermined value in the output video stream.

9. The mobile computing device of claim 7 wherein the video processor is coupled to utilize chroma key compositing to trim the background from the first camera video stream.

10. The mobile computing device of claim 7 wherein the video processor further comprises:
   a face detection unit coupled to the first video camera to receive the first camera video stream, wherein the face detection unit is coupled to determine a location of a face of the subject in the first camera video stream;
   a face edge detection unit coupled to the face detection unit, wherein the face edge detection unit is coupled to detect an edge of the face of the subject in the first camera video stream;
   a subject identification unit coupled to the face edge detection unit, wherein the subject identification unit is coupled to identify a body of the subject in the first camera video stream; and
   a background trimming unit coupled to the subject identification unit, wherein the background trimming unit is coupled to trim the background from the first camera video stream to leave the face and the body of the subject alone in the first video layer of the output video stream.

11. The mobile computing device of claim 1 wherein the output video stream including the first video layer, the second video layer and third video layer is coupled to be uploaded to a server.

12. The mobile computing device of claim 11 wherein the output video stream is coupled to be broadcast by the server to a plurality of receivers.

13. The mobile computing device of claim 11, wherein the output video stream is coupled to be uploaded to the server through an Internet wireless network including at least one of a Wi-Fi network, a mobile broadband network, and a telephone network.

14. The mobile computing device of claim 12, wherein the mobile computing device is coupled to upload the output video stream to the server in real-time, and wherein the server is coupled to broadcast the output video stream in real-time to the plurality of receivers using at least one of a wired Internet network and a wireless Internet network.

15. The mobile computing device of claim 14, wherein the real-time upload of the output video stream from the mobile computing device to the server and wherein the real-time broadcasting of the output video stream from the server to the plurality of receivers includes delays caused by Internet traffic.

16. The mobile computing device of claim 1, wherein the mobile computing device is one of a mobile phone, a smartphone or a tablet computer.

17. A network, comprising:
   a server;
   a first mobile computing device connected to the server, the first mobile computing device including a first camera on a first side of the first mobile computing device coupled to produce a first camera video stream;
   a stereo camera connected to the server, the stereo camera including a second camera coupled to produce a second camera video stream, and the stereo camera further including a third camera coupled to produce a third camera video stream;
   a video processor included in the first mobile computing device, wherein the video processor is coupled to receive the first camera video stream to generate a first video layer of an output video stream, and wherein the video processor is coupled to receive the second camera video stream and the third camera video stream to generate a second video layer and a third video layer of the output video stream from the second camera video stream, wherein the video processor is coupled to overlay the first video layer between the second video layer and the third video layer in the output video stream, and wherein the video processor is coupled to upload the output video stream to the server; and
   a plurality of receivers coupled to the server to receive the output video stream.

18. The network of claim 17 wherein the stereo camera is included in the first mobile computing device on a second side of the first mobile computing device.

19. The network of claim 17 wherein the stereo camera is included in a second mobile computing device, wherein the second computing device is coupled to upload the second camera video stream and the third camera video stream to the server, and wherein the video processor of the first mobile computing device is coupled to receive the second camera video stream and the third camera video stream from the server.

20. The network of claim 19 wherein the second mobile computing device is one of a mobile phone, a smartphone or a tablet computer.

21. The network of claim 17 wherein the video processor is coupled to generate the second video layer and the third video layer of the output video stream from the second camera video stream in response to the second camera video stream and the third camera video stream such that a third object in the third video layer of the output video stream is farther away from the stereo camera than a second object in the second video layer of the output video stream.

22. The network of claim 21 wherein the video processor is coupled to overlay a first object in the first video layer of the output video stream between the second video layer and the third video layer of the output video stream, wherein the video processor is coupled to scale the first object in the first video layer to be farther from the stereo camera than the second object in the second video layer, and wherein the first object in the first video layer is coupled to be scaled by the video processor to be closer to the stereo camera than the third object in the third video layer of the output video stream.

23. The network of claim 22 wherein the second object in the second video layer of the output video stream occludes the first object in the first video layer of the output video stream, and wherein the first object in the first video layer of the output video stream occludes the third object in the third video layer of the output video stream.

24. The network of claim 21 wherein the video processor is further coupled to identify the second object in the second and third camera video streams and determine a distance of the second object from the stereo camera based on a parallax of the second object between the second and third camera video streams, wherein the video processor is further coupled to identify the third object in the second and third camera video streams and determine a distance of the third object from the stereo camera based on a parallax of the third object between the second and third camera video streams, wherein the distance of the second object from the stereo camera is less than the distance of the third object from the stereo camera.

25. The network of claim 22 wherein the video processor is further coupled to overlay any objects identified in the second and third camera video stream that are closer to the stereo camera than a mid video layer distance from the stereo camera in the second video layer, wherein the video processor is further coupled to overlay any objects identified in the second and third camera video stream that are farther from the stereo camera than the mid video layer distance in the third video layer, and wherein the video processor is further coupled to overlay the first object to be at the mid video layer distance from the stereo camera in the first video layer of the output video stream.

26. The network of claim 17 wherein the video processor is further coupled to trim a background from the first camera video stream to overlay a subject alone in the first video layer between the second video layer and the third video layer in the output video stream, wherein the subject is a user of the first mobile computing device.

27. The network of claim 26 wherein the video processor is further coupled to scale the subject in the first video layer of the output video stream such that a width of a face of the subject is scaled to be equivalent to a predetermined value in the output video stream.

28. The mobile computing device of claim 26 wherein the video processor is coupled to utilize chroma key compositing to trim the background from the first camera video stream.

29. The network of claim 26 wherein the video processor further comprises:
a face detection unit coupled to the first video camera to receive the first camera video stream, wherein the face detection unit is coupled to determine a location of a face of the subject in the first camera video stream;
a face edge detection unit coupled to the face detection unit, wherein the face edge detection unit is coupled to detect an edge of the face of the subject in the first camera video stream;
a subject identification unit coupled to the face edge detection unit, wherein the subject identification unit is coupled to identify a body of the subject in the first camera video stream; and
a background trimming unit coupled to the subject identification unit, wherein the background trimming unit is coupled to trim the background from the first camera video stream to leave the face and the body of the subject alone in the first video layer of the output video stream.

30. The network of claim 17 wherein the first mobile computing device is one of a mobile phone, a smartphone or a tablet computer.

31. A method for overlaying three video layers in an output video stream, comprising:
identifying objects in second and third camera video streams received from a stereo camera;
determining respective distances between the stereo camera and each of the objects identified in the second and third camera video streams;
placing any objects identified in the second and third camera video streams that are less than a mid video layer distance from the stereo camera in a second video layer;
placing any objects identified in the second and third camera video streams that are greater than the mid video layer distance from the stereo camera in a third video layer;
identifying a subject in a first camera video stream received from a first camera;
trimming a background from the first camera video stream to leave the identified subject alone in the first camera video stream;
placing the identified subject alone in a first video layer; and
overlaying the first video layer between the second and third video layers in the output video stream, wherein the first video layer is generated from the first camera video stream, wherein the second video layer and the third video layer are generated from the second camera video stream in response to the second camera video stream and the third camera video stream.

32. The method of claim 31 further comprising:
detecting a face of the identified subject in the first camera video stream;
identifying a body of the identified subject in the first camera video stream, wherein the background is trimmed from the first camera video stream to leave the face and the body of the identified subject alone in the first video layer.

33. The method of claim 32 further comprising scaling the identified subject to be at the mid video layer distance from the stereo camera in the first video layer such that a width of the face of the identified subject is scaled to be equivalent to a predetermined value in the output video stream.

34. The method of claim 31 wherein identifying the subject on the first camera video stream comprises utilizing chroma key compositing in the first camera video stream.

35. The method of claim 31 wherein overlaying the first video layer between the second and third video layers in the output video stream comprises:
occluding the identified subject in the first video layer with said any objects identified in the second and third camera video streams that are less than the mid video layer distance from the stereo camera in the second video layer; and
occluding said any objects identified in the second and third camera video streams that are greater than the mid video layer distance from the stereo camera in the third video layer with the identified subject in the first video layer.

36. The method of claim 31 wherein the first camera is on a first mobile computing device.

37. The method of claim 31 wherein the stereo camera is on a second mobile computing device.

* * * * *